United States Patent [19]

Hanitzsch

[11] Patent Number: 4,938,826

[45] Date of Patent: Jul. 3, 1990

[54] METHOD OF ONE OR TWO-SIDE COATING OF THIN PLATES

[75] Inventor: Udo Hanitzsch, Bielefeld, Fed. Rep. of Germany

[73] Assignee: Firma Theodor Hymmen, Bielefeld, Fed. Rep. of Germany

[21] Appl. No.: 207,372

[22] Filed: Jun. 15, 1988

[30] Foreign Application Priority Data

Jul. 10, 1987 [DE] Fed. Rep. of Germany ....... 3722835

[51] Int. Cl.$^5$ .............................................. B32B 31/18
[52] U.S. Cl. ...................................... 156/269; 156/93; 156/302; 156/522
[58] Field of Search ....................... 156/324, 253, 304.3, 156/93, 269, 302, 522

[56] References Cited

U.S. PATENT DOCUMENTS

| | | | |
|---|---|---|---|
| 4,170,511 | 10/1979 | Milne | 156/498 |
| 4,420,359 | 12/1983 | Goldsworthy | 156/583.5 X |
| 4,666,551 | 5/1987 | Soberay et al. | 156/312 X |
| 4,769,098 | 9/1988 | Cederholme et al. | 156/304.3 X |
| 4,785,698 | 11/1988 | Stork | 83/461 X |

Primary Examiner—Michael W. Ball
Assistant Examiner—James J. Engel, Jr.
Attorney, Agent, or Firm—Michael J. Striker

[57] ABSTRACT

A method of at least one-sided coating of thin plates with a laminating material in a continuous operation comprises supplying a laminating material into a pressing gap, supplying a plurality of thin plates into the pressing gap, applying a pressure in the pressing gap to the thin plates and the laminating material so as to laminate the former with the latter, the supplying a plurality of thin plates including connecting neighboring ones of the thin plates with one another at their end sides facing toward one another with alignment of their upper and lower limiting surfaces so as to form a plate strand and then supplying the thusly formed plate strand into the pressing gap, and separating the plate strand into individual plates by dividing the plate strand in connecting regions of the latter.

16 Claims, 3 Drawing Sheets

METHOD OF ONE OR TWO-SIDE COATING OF THIN PLATES

BACKGROUND OF THE INVENTION

The present invention relates to a method of one or two-side laminating of thin plates with foils and the like, with the use of a band press or a laminating machine with a pressing gap, into which the thin plates and the laminating material are supplied in a continuous process.

A method of the above mentioned general type is known in the art. In accordance with the known method, a row of thin plates having identical thicknesses is supplied into a mouth of a double band press or a laminating machine. During passage through the pressing gap which is limited in the double band press by the working runs of the endless pressing band, foils or resin-impregnated paper laminate the upper and lower limiting surfaces of the thin plates under the action of pressure and heat. The foil or paper is then cut in the abutment region between two neighboring thin plates.

The thin plates, for example, thin chip plates, hard fiber plates and the like, have a thickness of between 2 and 10 millimeter. Due to the small plate thickness as well as manufacturing and cutting inaccuracies, it is possible that the neighboring outer surfaces of two thin plates are not in alignment with one another. Thereby an introduction into the pressing mouth or into the pressing gap of neighboring thin plates with end surfaces which abut against one another is not guaranteed. In the event of failing complete surface support between two neighboring plates in the region of their end walls, there is the danger that the subsequent plate is displaced onto the preceding plate or an excessively great distance is formed between two neighboring thin plates. This results in that in this region the foil and the like to be laminated does not find a required abutment and an adherence of the foil to the endless pressing band can occur. The feeding the double press band with thin plates which lie over one another in the abutment region can lead to a destruction of the endless pressing bands.

SUMMARY OF THE INVENTION

Accordingly, it is an object of the present invention to provide a method of laminating thin plates with a laminating material which avoids the disadvantages of the prior art.

In keeping with these objects and with others which will become apparent hereinafter, one feature of the present invention resides, briefly stated, in that the thin plates are connected with one another at their end sides which face toward one another with alignment of their upper and lower mating surfaces so as to form a plate strand, and the thin plates are supplied into a pressing gap in form of the plate strand which is laminated therewith foils or the like, whereupon behind the press the individual plates are produced from the plate strand by separation in a connecting region of the thin plates in the strand.

The connection of the individual thin plates to form a plate strand not only insures that in the band press or the laminating machine the foils and the like can unobjectionably laminate the thin plates with avoiding operational disturbances, but it also considerably simplifies the means for supplying the thin plates to the band plate.

In accordance with further features of the present invention, the end sides of the neighboring thin plates can be connected with one another by adhesive strips, joining, by wedge teeth, by sewing, by butt-glueing and the like.

Also U-shaped clamps can be used for connection of the thin plates with one another. Finally, the above described approaches can be combined with one another.

In addition, two neighboring thin plates can be connected with one another in their corner regions by a U-shaped adhesive clip which extends inwardly of the side edges of the plate strand by a predetermined distance "a".

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
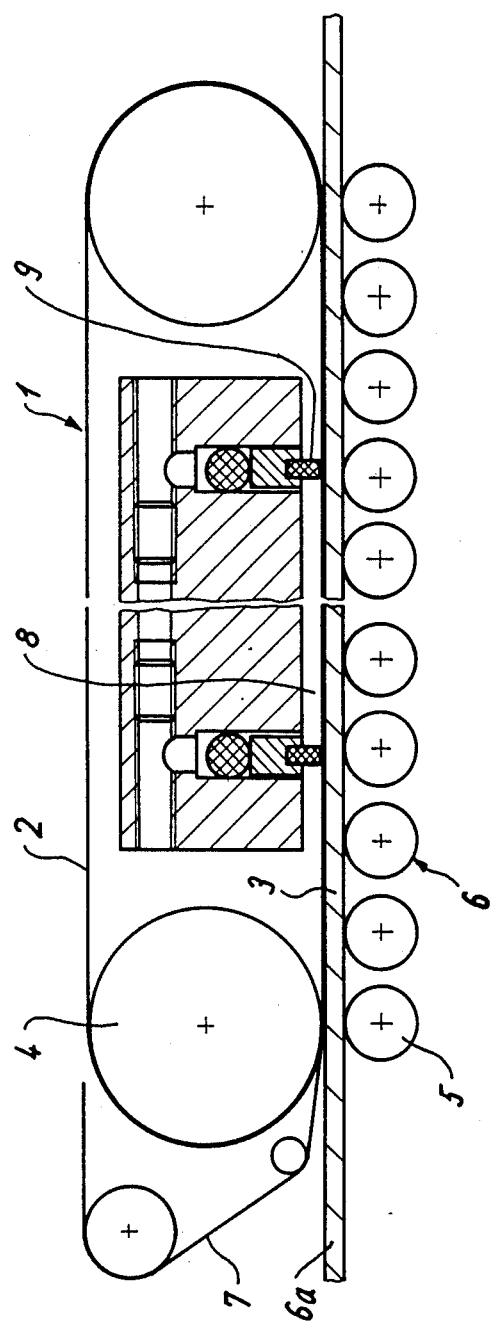
FIG. 1 is a view which schematically shows a part of a laminating device with a band press, partially sectioned, illustrating a method in accordance with the present invention.

A band press is identified with reference numeral 1 in FIG. 1. It is provided with an endless pressing band 2 having a working run which limits a pressing gap 3 from its one side. A roller conveyor 6 has a plurality of rollers 5. The working run of the pressing band 2 with a roller 4 forms together with a roller 5 of the roller conveyor 6 an inlet mouth.

A strand of plates 6a and a foil 7 are insertable into the mouth formed in the above explained manner. The working pressure in the pressing gap 3 is produced by a pressure cushion or chamber 8 and sealed relative to the pressing band 2 by a peripherally closed seal 9.

The strand of plates 6a is composed of individual thin plates which have identical thicknesses. The thin plates are connected with one another in the region of their end faces.

Figure 2:
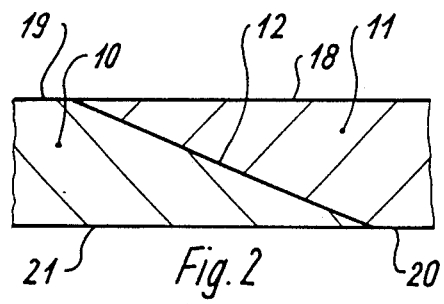
FIGS. 2–6 illustrate several modifications of connections between neighboring thin plates, in accordance with the inventive method.

As can be seen from FIG. 2, thin plates 10 and 11 can be connected with one another by a joint. For this purpose the thin plates 10 and 11 are provided at their proximal ends with inclined connecting surfaces 12. The neighboring thin plates are connected with one another along these inclined surfaces 12, for example by glueing.

Figure 3:
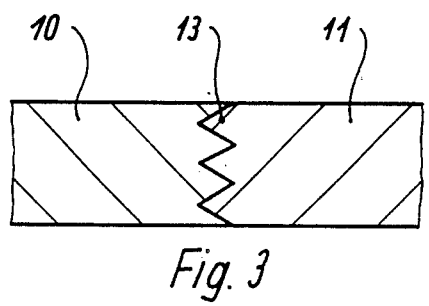

In the embodiment shown in FIG. 3 the thin plates 10 and 11 are provided on their proximal surfaces with wedge teeth 13. The wedge teeth of neighboring plates engage into each other and provide for a form-locking connection of the plates. The connecting surfaces of the wedge teeth 13 are glued with each other.

Figure 4:
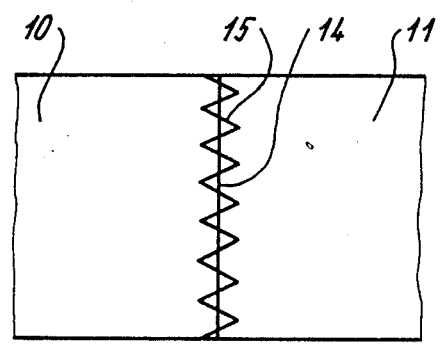

In the embodiment of FIG. 4 the neighboring thin plates 10 and 11 are connected with one another by sewing. As can be seen from this Figure, the neighboring plates 10 and 11 abut against one another along an abutment surface 14, and a seam which is identified with reference numeral 15 extends in a zigzag shaped manner at both sides of the abutment surface 14.

Figure 5:
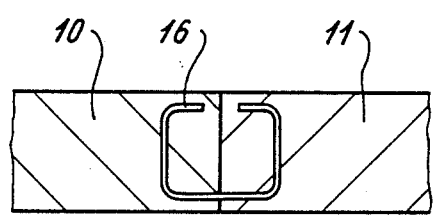

In the embodiment of FIG. 5 the neighboring thin plates 10 and 11 are connected with one another by a clamp identified with reference numeral 16. The clamp 16 is completely embedded in the plates.

Figure 6:
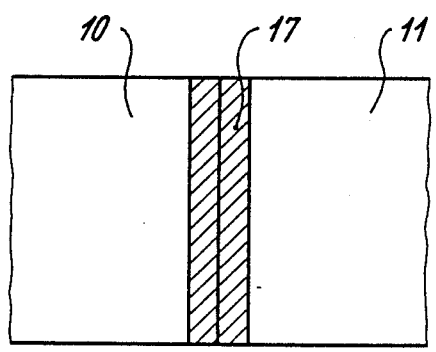

FIG. 6 shows a further embodiment of the invention. Here the neighboring thin plates 10 and 11 are connected with one another by an adhesive strip which is identified with reference numeral 17.

The interconnection of the neighboring thin plates by means of the adhesive strips or by means of the sewing can be performed on one side of the thin plates, or on both sides thereof. The thin plates are connected with one another so that their limiting surfaces 18 and 19 as well as 20 and 21 are in alignment with one another.

The neighboring thin plates can also be connected with one another by means of a butt-glueing.

Figure 7:
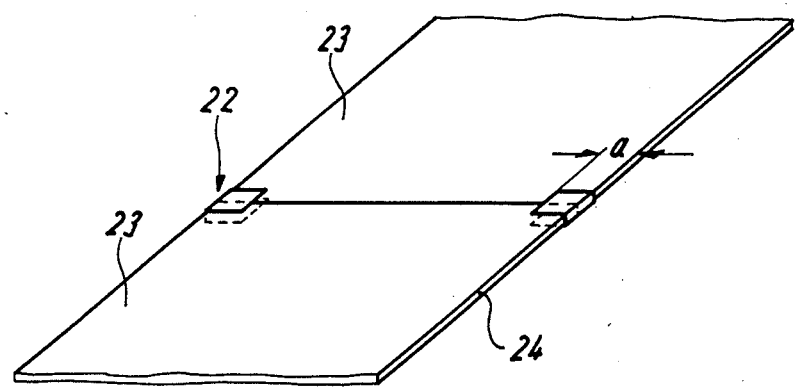
FIG. 7 is a view showing a plate strand in perspective, in accordance with a further embodiment of the invention.

FIG. 7 shows a strand of plates in perspective. The strand is formed of thin chip plates which have a tendency to raise at the corners and to become generally wavy.

For restoring these raised corners to a flat flush position in the region of two neighboring individual plates of the plate strand, a U-shaped adhesive clip 22 is used. The clip 22 engages the corner regions of two neighboring individual plates 23 on three sides thereof. The clip can extend inwardly from side edges 24 of the plate strand over a distance identified as "a". This distance can amount for example to 50 mm.

By means of the above described U-shaped adhesive clip, the corners of the neighboring thin plates of the plate strand are sufficiently restored and strengthened.

The arrangement of the adhesive clips in the corner regions of the two neighboring thin chip plates of a plate strand can be provided in addition to the connections which are described in the preceding Figures.

The thin plates which are connected with one another in a strand in the inventive manner explained in detail hereinbelow are laminated with, foils and the like. Then, behind the band press the strand of the plates is separated into the individual plates by cutting in the connecting region of the plates. It is to be understood that the separation or cutting can be performed by any conventional means which are suitable for this purpose.

It will be understood that each of the elements described above, or two or more together, may also find a useful application in other types of constructions differing from the types described above.

While the invention has been illustrated and described as embodied in a one- or two-side coating of thin plates with foils or the like, with the use of a band press or a laminating machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of at least one-sided laminating of thin plates with a coating material in a continuous operation, comprising the steps of supplying a coating material into a pressing gap; supplying a plurality of thin plates into the pressing gap; applying a pressure in the pressing gap to the thin plates and the laminating material so as to laminate the former with the latter, said supplying a plurality of thin plates including connecting neighboring ones of the thin plates with one another at their end sides facing toward one another with alignment of the upper and lower limiting surfaces so as to form a plate strand prior to the supplying thin plates into the pressing gap and laminating them with the laminating material and thereafter supplying the plate strand thusly formed from the connected thin plates into the pressing gap for the laminating of the latter; and separating the plate strand into individual plates by dividing the plate strand in all connecting regions of the latter.

2. A method as defined in claim 1, wherein said supplying a laminating material includes supplying a material selected from the group consisting of a foil and a resin impregnated paper.

3. A method as defined in claim 1, wherein said supplying a plurality of thin plates and a laminating material and applying a pressure in a pressing gap include using a band press to which a plurality of thin plates and a laminating material are supplied and which has a pressing gap in which the plates are laminated with the laminating material.

4. A method as defined in claim 1, wherein said supplying a plurality of thin plates and laminating material and applying a pressure in a pressing gap include using a laminating machine to which a plurality of thin plates and a laminating material are supplied and which has a pressing gap in which the plates are laminated with the laminating material.

5. A method as defined in claim 1, wherein said step of dividing the plate strand includes cutting the plate strand in the connecting regions.

6. A method as defined in claim 1, wherein said step of connecting the thin plates includes connecting the thin plates with one another in the region of the end sides by an adhesive strip.

7. A method as defined in claim 1, wherein said step of connecting the thin plates includes connecting the thin plates with one another in the region of the end sides by forming a butt joint.

8. A method of at least one-sided laminating of thin plates with a laminating material in a continuous operation, comprising the steps of supplying a laminating material into a pressing gap; supplying a plurality of thin plates into the pressing gap; applying a pressure in the pressing gap to the thin plates and the laminating material so as to laminate the former with the latter, said supplying a plurality of thin plates including connecting neighboring ones of the thin plates with one another at their end sides facing toward one another by wedge teeth formed on the end sides of the thin plates with alignment of the upper and lower limiting surfaces so as to from a plate strand and then supplying the thusly formed plate strand into the pressing gap; and separating the plate strand into individual plates by dividing the plate strand in connecting regions of the latter.

9. A method of at least one-sided laminating of thin plates with a laminating material in a continuous operation, comprising the steps of supplying a laminating material into a pressing gap; supplying a plurality of thin plates into the pressing gap; applying a pressure in the pressing gap to the thin plates and the laminating material so as to laminate the former with the latter, said supplying a plurality of thin plates including connecting neighboring ones of the thin plates with one another at their end sides facing toward one another by sewing with alignment of the upper and lower limiting surfaces so as to form a plate strand and then supplying the thusly formed plate strand into the pressing gap; and separating the plate strand into individual plates by dividing the palte strand in connecting regions of the latter.

10. A method as defined in claim 1, wherein said step of connecting the thin plates includes connecting the thin plates with one another in the region of the end sides by butt-glueing.

11. A method of at least one-sided laminating of thin plates with a laminating material in a continuous operation, comprising the steps of supplying a laminating material into a pressing gap; supplying a plurality of thin plates into the pressing gap; applying a pressure in the pressing gap to the thin plates and the laminating material so as to laminate the former with the latter, said supplying a plurality of thin plates including connecting neighboring ones of the thin plates with one another at their end sides facing toward one another by U-shaped clamps with alignment of the upper and lower limiting surfaces so as to form a plate strand and then supplying the thusly formed plate strand into the pressing gap; and separating the plate strand into individual plates by dividing the plate strand in connecting regions of the latter.

12. A method as defined in claim 7, wherein said connecting of the thin plates also includes applying an adhesive strip additionally to the forming the butt joint.

13. A method as defined in claim 9, wherein said connecting the thin plates includes applying an adhesive strip, additionally to the sewing.

14. A method as defined in claim 6, wherein said connecting by an adhesive strip includes applying an adhesive strip on each side of the thin plates.

15. A method of at least one-sided coating of thin plates with a coating material in a continuous operation, comprising the steps of supplying a laminating material into a pressing gap; supplying a plurality of thin plates into the pressing gap; applying a pressure in the pressing gap to the thin plates and the laminating material so as to laminate the former with the latter, said supplying a plurality of thin plates including connecting neighboring ones of the thin plates with one another at their end sides facing toward one another at their proximal corner regions by a U-shaped adhesive clip with alignment of the upper and lower limiting surfaces so as to form a plate strand and then supplying the thusly formed plate strand into the pressing gap; and separating the plate strand into individual plates by dividing the plate strand in connecting regions of the latter.

16. A method as defined in claim 20, wherein said connecting by the U-shaped adhesive clip includes applying the adhesive clip so that its portions extend inwardly from side edges of the plate strand a distance from the side edges.

* * * * *